United States Patent
Liu et al.

(10) Patent No.: US 9,772,517 B2
(45) Date of Patent: Sep. 26, 2017

(54) DISPLAY

(71) Applicant: Innolux Corporation, Chu-Nan, Miao-Li County (TW)

(72) Inventors: Yu-Tsung Liu, Chu-Nan (TW); Te-Yu Lee, Chu-Nan (TW); Chien-Ta Huang, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 0 days.

(21) Appl. No.: 14/985,845

(22) Filed: Dec. 31, 2015

(65) Prior Publication Data

US 2016/0202570 A1 Jul. 14, 2016

(30) Foreign Application Priority Data

Jan. 12, 2015 (TW) .............................. 104100914 A

(51) Int. Cl.
G02F 1/1343 (2006.01)
G02F 1/1333 (2006.01)
G02F 1/1339 (2006.01)
G02F 1/1362 (2006.01)

(52) U.S. Cl.
CPC ........ *G02F 1/1333* (2013.01); *G02F 1/13394* (2013.01); *G02F 1/136227* (2013.01); *G02F 2001/133357* (2013.01); *G02F 2001/134372* (2013.01)

(58) Field of Classification Search
CPC ........ G02F 2001/134372; G02F 2001/134381; G02F 1/134363
See application file for complete search history.

(56) References Cited

U.S. PATENT DOCUMENTS

2011/0075081 A1* 3/2011 Ishida .................. G02F 1/1333 349/123
2014/0368775 A1* 12/2014 Park .................. G02F 1/133723 349/123

FOREIGN PATENT DOCUMENTS

CN 102681276 A 9/2012
CN 103728758 A 4/2014

OTHER PUBLICATIONS

Taiwanese Office Action dated Mar. 23, 2016.

* cited by examiner

*Primary Examiner* — Phu Vu
(74) *Attorney, Agent, or Firm* — Rabin & Berdo, P.C.

(57) ABSTRACT

A display including a first substrate, a second substrate and spacers is provided. The first substrate includes a first base body, a device structure, an insulating layer, a pixel electrode layer and a planarization layer. The device structure is formed on the first base body. The insulating layer is formed on the device structure, and has at least one through hole. The pixel electrode layer is formed on the insulating layer. A portion of the pixel electrode layer extends into the through hole and electrically connects to the device structure. The pixel electrode layer forms a concave portion corresponding to the through hole. The planarization layer is formed on the pixel electrode layer and filled into the concave portion. The second substrate is disposed opposite to the first substrate. The spacers are disposed between the first substrate and the second substrate, and are correspondingly disposed on the planarization layer.

10 Claims, 6 Drawing Sheets

DISPLAY

DISPLAY

This application claims the benefit of Taiwan application Serial No. 104100914, filed on Jan. 12, 2015, the subject matter of which is incorporated herein by reference.

TECHNICAL FIELD

This disclosure relates in general to a display, and more particularly to a display having spacers disposed between two opposite substrates.

BACKGROUND

Displays play an important role in everyday life. The displays have been widely used in the fields such as TV, desk-top computers, notebook computers, tablets, mobile devices, biomedicine, industry and traffics. Examples of the displays include CRT display, liquid crystal display, OLED display, plasma display and the like, wherein the liquid crystal display is the most popular display. In comparison to the conventional CRT display, the liquid crystal display has benefits of smaller volume, lighter weight, lower radiation, lower power consumption, and so on. Until now, the displays are continuously improved.

SUMMARY

The disclosure is directed to the improvement of display.

According to some embodiments, a display includes a first substrate, a second substrate and a plurality of spacers. The first substrate includes a first base body, a device structure, an insulating layer, a pixel electrode layer and a planarization layer. The device structure is disposed above the first base body. The insulating layer is disposed above the device structure. The insulating layer has at least one through hole. The pixel electrode layer is disposed above the insulating layer. A portion of the pixel electrode layer extends into the through hole and electrically connects to the device structure. The pixel electrode layer forms a concave portion corresponding to the through hole. The planarization layer is formed on the pixel electrode layer and filled into the concave portion. The second substrate is disposed opposite to the first substrate. The spacers are disposed between the first substrate and the second substrate, and are correspondingly disposed on the planarization layer.

Figure 1:
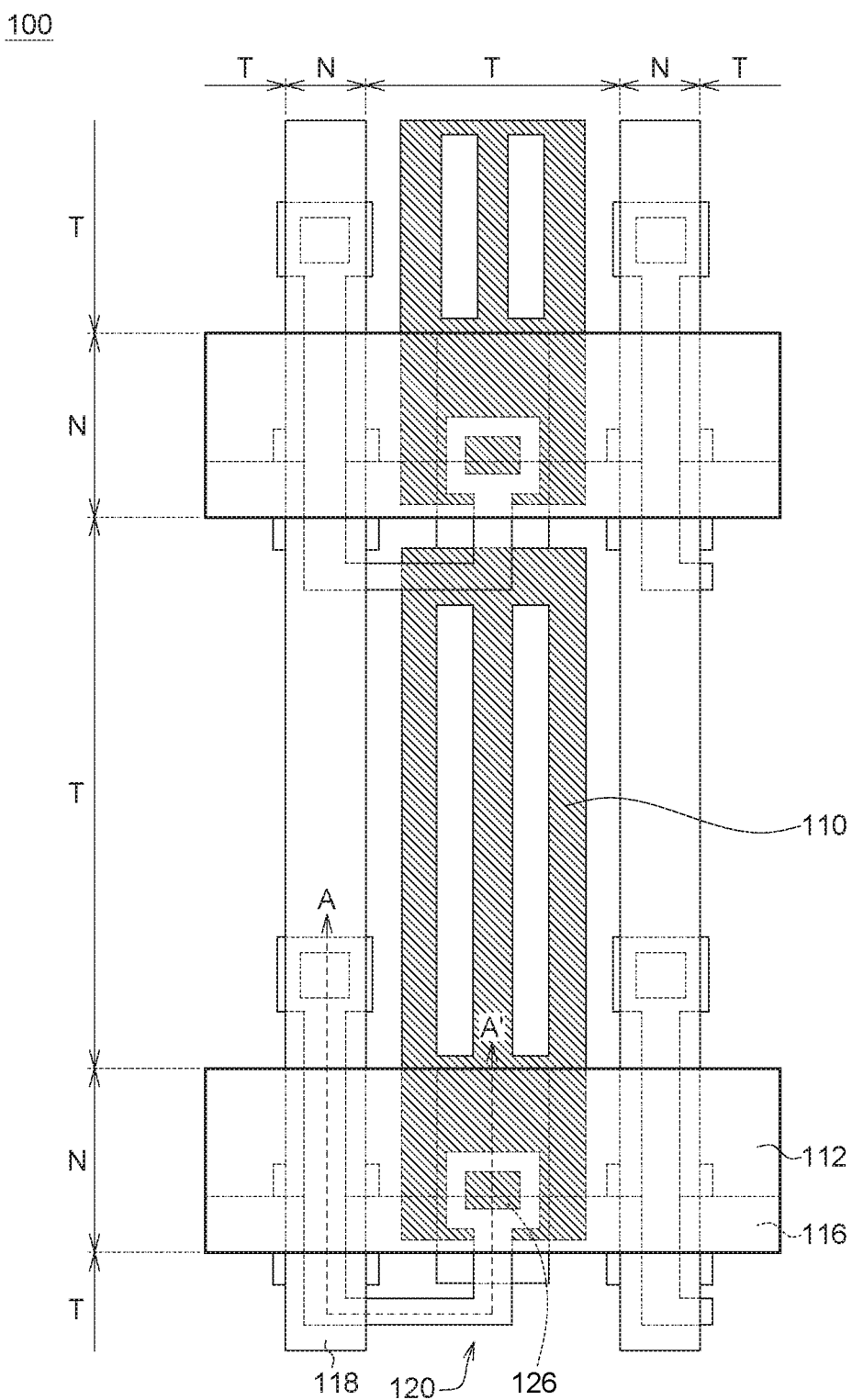
FIGS. 1 to 3 are schematic diagrams of a display according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
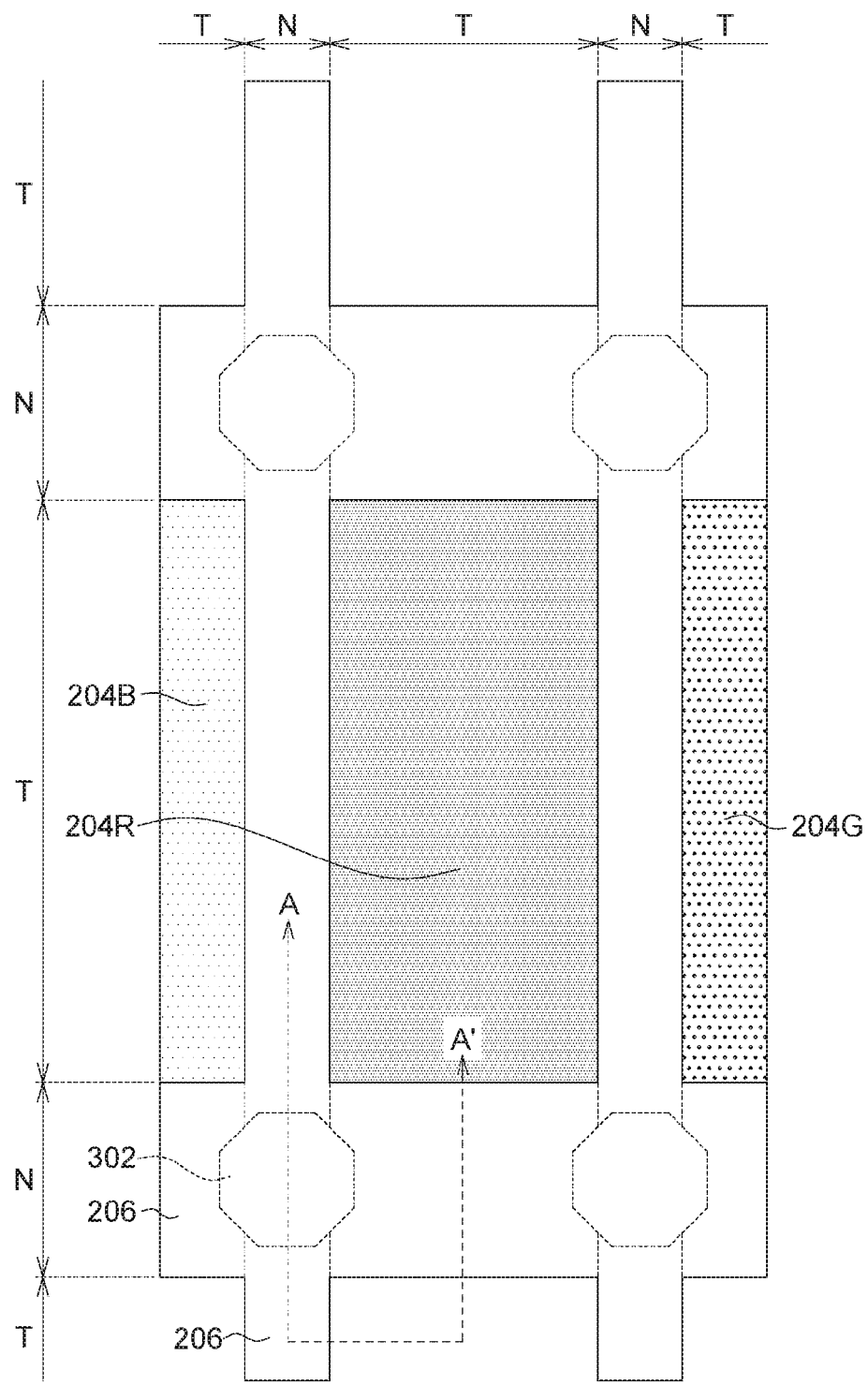
Figure 3:
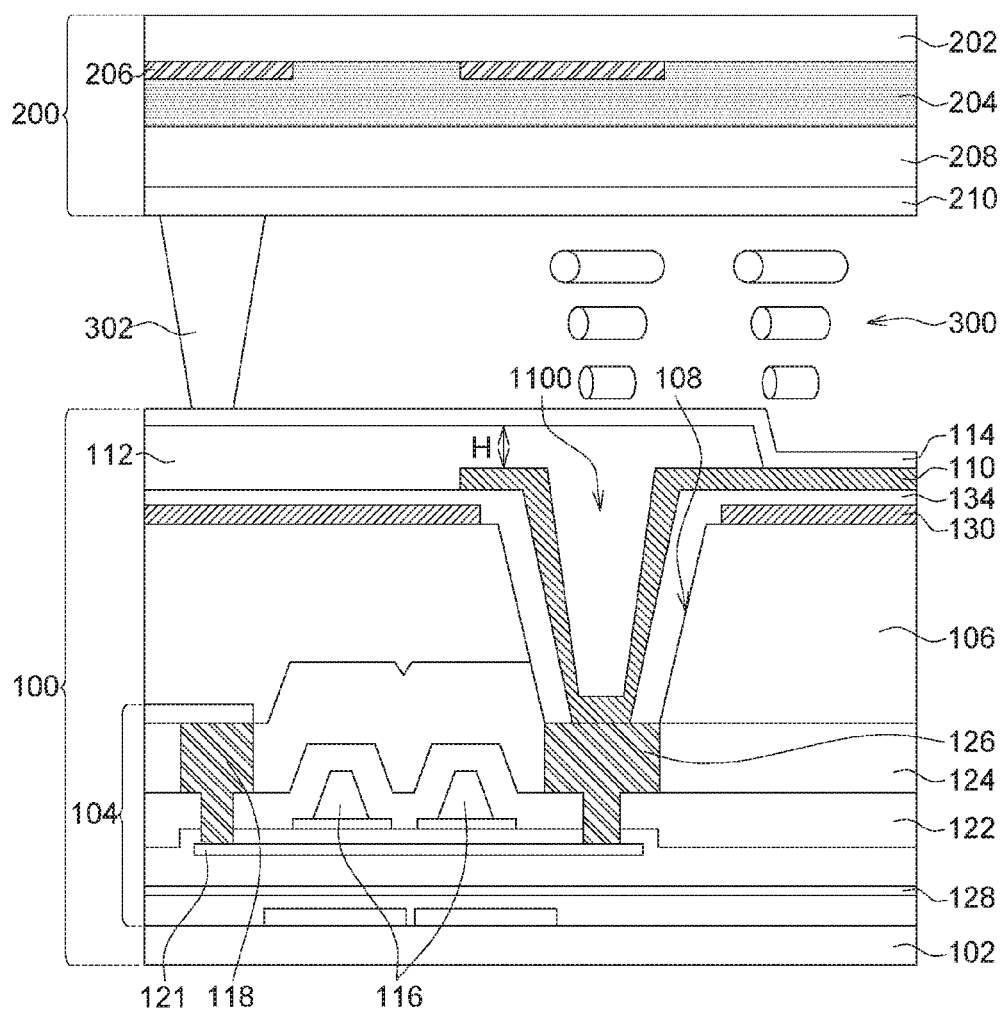

Referring to FIGS. 1 to 3, schematic diagrams of a display according to one embodiment are shown. FIG. 3 is a cross-sectional view of the display along the cross-sectional line A-A' of FIGS. 1 and 2. The display includes a first substrate 100, a second substrate 200 and a plurality of spacers 302. The first substrate 100 includes a first base body 102, a device structure 104, an insulating layer 106, a pixel electrode layer 110 and a planarization layer 112. The device structure 104 is disposed above the first base body 102. The insulating layer 106 is disposed above the device structure 104. The insulating layer 106 has at least one through hole 108. The pixel electrode layer 110 is disposed above the insulating layer 106, and a portion of the pixel electrode layer 110 extends into the through hole 108 and electrically connects to the device structure 104. The pixel electrode layer 110 forms a concave portion 1100 corresponding to the through hole 108. The planarization layer 112 is formed on the pixel electrode layer 110 and filled into the concave portion 1100. The second substrate 200 is disposed opposite to the first substrate 100. The spacers 302 are disposed between the first substrate 100 and the second substrate 200, and are correspondingly disposed on the planarization layer 112. It is noted that when an element is described as being "on", "above", "under", . . . , or "connected to" another element, it can be directly on, above, under, . . . , or connected to the other element, or at least one intervening element may be present.

Specifically, the device structure 104 of the first substrate 100 may include a plurality of scan lines 116, a plurality of data lines 118 and a plurality of thin-film transistors 120. The spacers 302 are arranged along the scan lines 116. The device structure 104 of the first substrate 100 may further include a first insulating interlayer 122, a second insulating interlayer 124, a via 126 and a buffer layer 128. The first insulating interlayer 122 and the second insulating interlayer 124 may be formed of silicon nitride ($SiN_x$) and silicon oxide ($SiO_x$), respectively. The pixel electrode layer 110 may be electrically coupled to the device structure 104 by the through hole 108. As such, the device structure 104 controls the pixel electrode layer 110 for image displaying. In the present embodiment, the thin-film transistors 120 are exemplarily formed of a low-temperature poly-silicon (LTPS) layer 121. However, other materials for an active layer such as an oxide semiconductor layer or amorphous silicon can be used. The first substrate 100 may further include a bottom electrode layer 130 and a passivation layer 134 separating the bottom electrode layer 130 and the pixel electrode layer 110. The bottom electrode layer 130 and the pixel electrode layer 110 may be formed of indium tin oxide (ITO), and the passivation layer 134 may be formed of silicon nitride ($SiN_x$). The insulating layer 106 and the planarization layer 112 may be formed of a polymer or photo-sensitive material, such as acrylic or a silicon-based material. Through the use of the photo-sensitive material, the planarization layer 112 may be firstly formed on the overall structure, and then unnecessary portions of the planarization layer 112 are removed in subsequent processing. In one embodiment, the insulating layer 106 and the planarization layer 112 are formed of the same material. The top surface of the planarization layer 112 is higher than the top surface of the pixel electrode layer 110. In one embodiment, the planarization layer 112 covers the pixel electrode layer 110 with a thickness H of 0.5 um to 2 um. In other words, the thickness H of the planarization layer 112 on the pixel electrode layer 110 is about 0.5 um to 2 um. The first substrate 100 may further include an alignment layer 114 formed on the pixel electrode layer 110 and the planarization layer 112, wherein the spacers 302 are disposed on the alignment layer 114. The alignment layer 114 may be formed of polyimide (PI).

The second substrate 200 may include a second base body 202, a color filter layer 204 and a black matrix layer 206. The black matrix layer is formed on the second base body 202. Then, the color filter layer 204 is formed. The color filter layer 204 includes, for example, a blue area 204B, a red area 204R and a green area 204G. The area not shielded by the black matrix layer 206 is defined as the penetrating area T, and the area shielded by the black matrix layer 206 is defined as the non-penetrating area N. The through hole 108 and the spacers 302 are disposed within the area shielded by the black matrix layer 206. The second substrate 200 may further include an overcoating layer 208 covering the color filter layer 204 and the black matrix layer 206. The second substrate 200 may further include an alignment layer 210 formed on the overcoating layer 208.

The display may further include a liquid crystal layer 300 disposed between the first substrate 100 and the second substrate 200. The spacers 302 are positioned in the liquid crystal layer 300. The spacers may be photoresist spacers.

Figure 4:
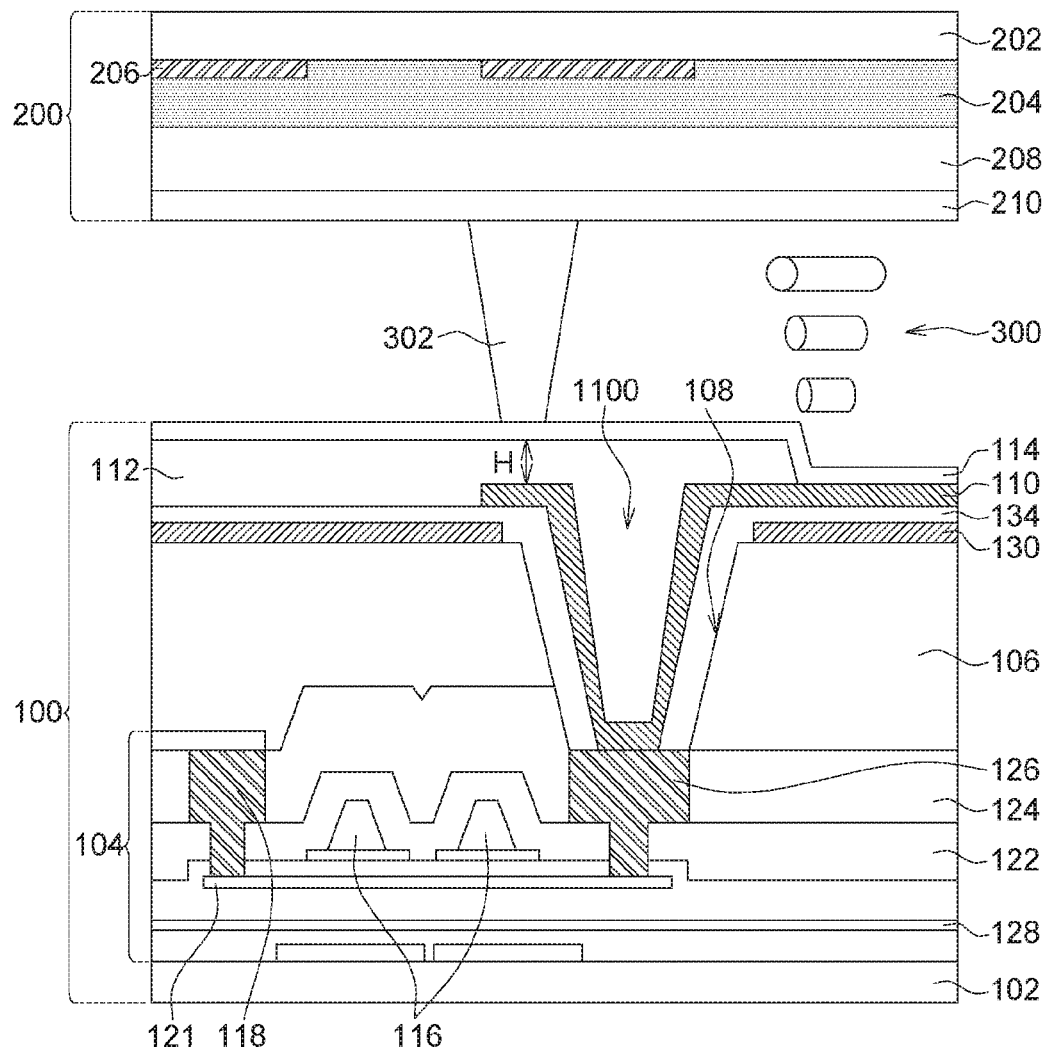
FIG. 4 is a schematic diagram of a display according to another embodiment.

In the display of the disclosure, the disposition of the planarization layer increases the area with flat surface. Thus, as shown in FIG. 4, even when the spacers are disposed above the through hole, the cell gap of liquid crystal layer will not be affected by the topography of the through hole. Since the cell gap between two substrates which are separated by the spacers does not change, the cell gap between the two substrates remains consistent. As the resolution of the display increases, both the pixel area and the cell gap gradually decrease. Without the disposition of the planarization layer, it is very likely that the spacers may fall into the through hole due to alignment error, and the cell gap between the two substrates may partly change accordingly. The cell gap between the two substrates greatly affects light penetration and chroma. If the spacers fall into the through hole, the optical properties of the display will deteriorate and become unsatisfactory. Thus, the design of introducing a planarization layer improves optical properties of the display, such as contrast ratio and the like.

Further, since the planarization layer is higher than the pixel electrode layer to a certain height, the size of the spacers can be reduced under the condition that the cell gap between the substrates remains the same. Thus, the area that needs to be shielded by the black matrix layer can be reduced, and thereby the aperture ratio of the display can be increased.

For the convenience of description, the disclosure is exemplarily focused on a liquid crystal display. However, the disclosure is not limited thereto, and is applicable to any displays having spacers disposed between two opposite substrates.

Figure 5:
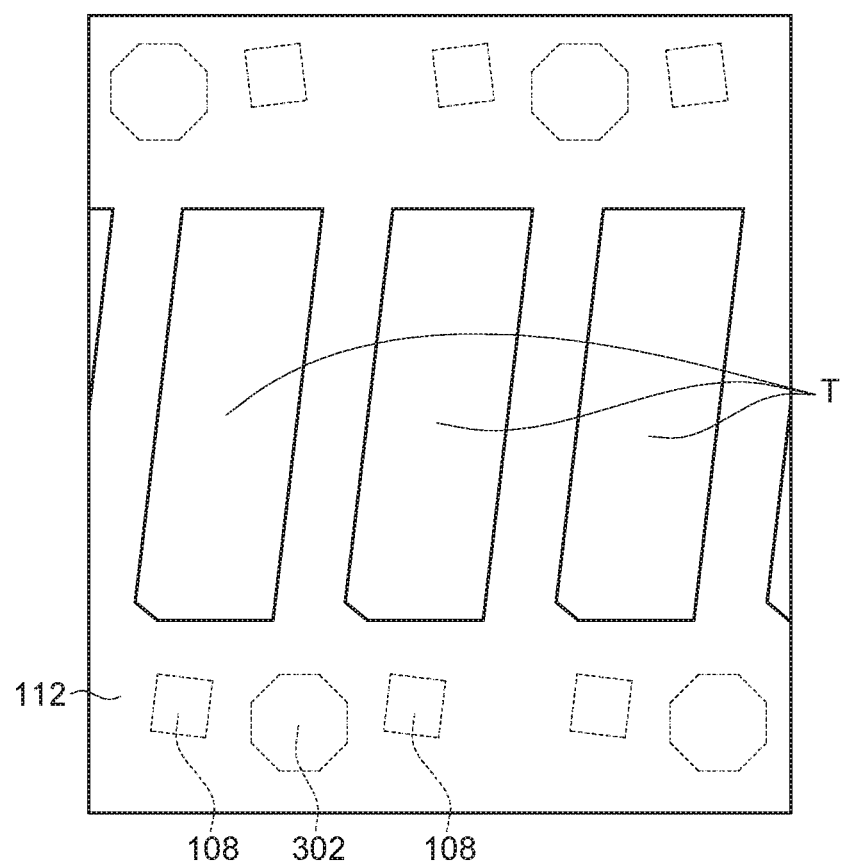
FIGS. 5 and 6 are schematic diagrams of displays according to different embodiments.
Figure 6:
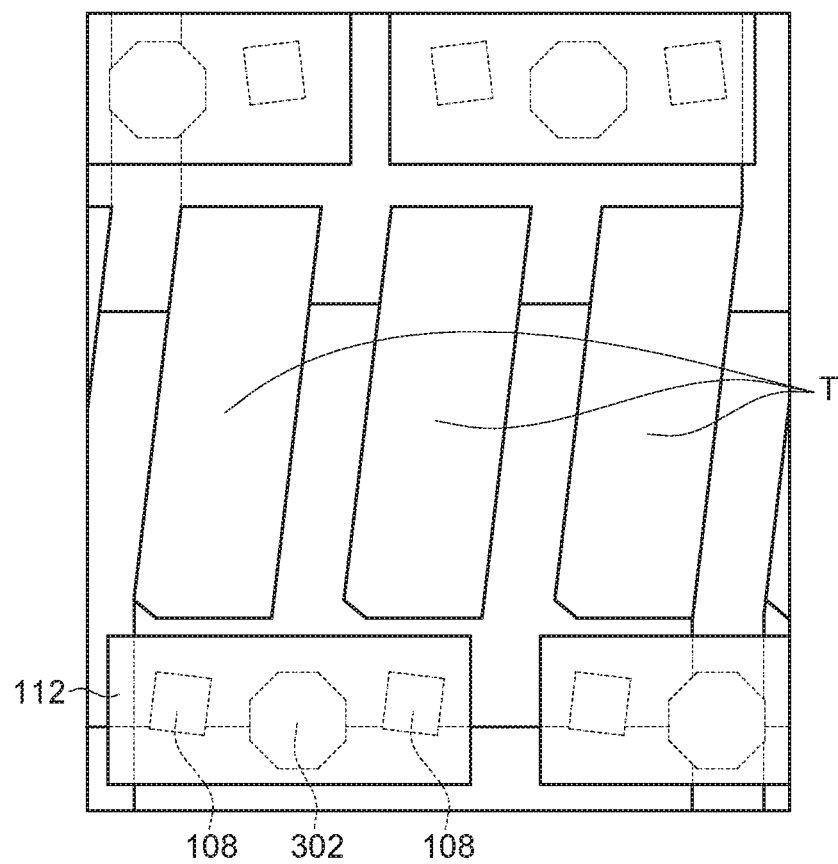

Referring to FIGS. 5 and 6, schematic diagrams of displays according to different embodiments are shown. As shown in FIGS. 5 and 6, the spacers 302 may be positioned between two through holes 108. In one embodiment, as shown in FIG. 5, the planarization layer 112 may have a belt pattern. In another embodiment, as shown FIG. 6, the planarization layer 112 may have an island pattern.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display, comprising:
   a first substrate comprising:
   a first base body;
   a device structure disposed above the first base body;
   an insulating layer disposed above the device structure, the insulating layer having at least one through hole;
   a pixel electrode layer disposed above the insulating layer, wherein a portion of the pixel electrode layer extends into the through hole and electrically connects to the device structure, and the pixel electrode layer forms a concave portion corresponding to the through hole; and
   a planarization layer formed on the pixel electrode layer and filled into the concave portion;
   an alignment layer formed on the pixel electrode layer and the planarization layer, wherein the alignment layer contacts the pixel electrode layer;
   a second substrate disposed opposite to the first substrate; and
   a plurality of spacers disposed between the first substrate and the second substrate, the spacers correspondingly disposed on the planarization layer.

2. The display according to claim 1, wherein the planarization layer has a belt pattern or an island pattern.

3. The display according to claim 1, wherein the planarization layer covers the pixel electrode layer with a thickness of 0.5 um to 2 um.

4. The display according to claim 1, wherein the planarization layer is formed of a photo-sensitive material.

5. The display according to claim 4, wherein the planarization layer is formed of acrylic or a silicon-based material.

6. The display according to claim 1, wherein the device structure comprises a plurality of scan lines, a plurality of data lines and a plurality of thin-film transistors, and the spacers are arranged along the scan lines.

7. The display according to claim 1, further comprising:
   a liquid crystal layer disposed between the first substrate and the second substrate, wherein the spacers are positioned in the liquid crystal layer.

8. The display according to claim 1,
   wherein the spacers are disposed on the alignment layer.

9. The display according to claim 1, wherein the second substrate comprises:
   a second base body;
   a black matrix layer formed on the second base body; and
   a color filter layer formed on the second base body.

10. The display according to claim 9, wherein the spacers are disposed within a shielding area of the black matrix layer.

* * * * *